(12) United States Patent
Doy

(10) Patent No.: US 11,786,945 B2
(45) Date of Patent: Oct. 17, 2023

(54) CLEANING NOZZLES OF A MACHINE

(71) Applicant: Caterpillar Paving Products Inc., Brooklyn Park, MN (US)

(72) Inventor: Nathaniel Doy, Maple Grove, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 133 days.

(21) Appl. No.: 16/817,296

(22) Filed: Mar. 12, 2020

(65) Prior Publication Data
US 2021/0283665 A1  Sep. 16, 2021

(51) Int. Cl.
  *B08B 9/032* (2006.01)
  *A01G 25/09* (2006.01)

(52) U.S. Cl.
  CPC .......... *B08B 9/0325* (2013.01); *B08B 9/0323* (2013.01); *A01G 25/09* (2013.01); *B08B 2203/0217* (2013.01)

(58) Field of Classification Search
  CPC .... A01G 25/09; B08B 9/0323; B08B 9/0325; B08B 2203/0217; B05B 15/555; B05B 15/55; B05B 15/50
  See application file for complete search history.

(56) References Cited

U.S. PATENT DOCUMENTS

| 4,050,078 A * | 9/1977 | Isayama ............... B41J 2/16552 347/7 |
| 5,513,911 A | 5/1996 | Schwing |
| 5,718,508 A | 2/1998 | Williams |
| 10,259,140 B1 | 4/2019 | Derose et al. |
| 10,399,247 B1 | 9/2019 | Al Jassmi et al. |
| 2013/0008361 A1* | 1/2013 | Trevino ............... A01B 79/005 137/551 |
| 2016/0326701 A1 | 11/2016 | Schlenker et al. |
| 2017/0251656 A1* | 9/2017 | Kolb ..................... A01C 23/047 |
| 2018/0178237 A1* | 6/2018 | Posselius ............. B05B 12/1418 |
| 2019/0076892 A1* | 3/2019 | Zhao ........................ B08B 3/08 |
| 2019/0358661 A1* | 11/2019 | Bharatiya ............. B05B 12/082 |

FOREIGN PATENT DOCUMENTS

| JP | 11077544 A | * | 3/1999 |
| JP | 11256511 A | * | 9/1999 |
| JP | 2004003200 A | * | 1/2004 |
| JP | 2004100146 A | * | 4/2004 |
| JP | 2006193888 A | * | 7/2006 |

OTHER PUBLICATIONS

Machine translation of JP11-077544A (Year: 1999).*
JP2006193888A Abstract (Year: 2006).*
JP2004003200A machine translation (Year: 2004).*
JP11256511A machine translation (Year: 1999).*
JP2004100146A machine translation (Year: 2004).*

* cited by examiner

Primary Examiner — Douglas Lee
(74) Attorney, Agent, or Firm — Harrity & Harrity LLP

(57) ABSTRACT

A controller associated with a machine may determine that a first subset of nozzles, of a plurality of nozzles of the machine, is to be cleaned. The controller may determine a first flow rate of the fluid through the first subset of nozzles and increase, based on determining that the first subset of nozzles is to be cleaned, the first flow rate of the fluid through the first subset of nozzles to a second flow rate of the fluid through the first subset of nozzles. The controller may decrease the second flow rate of the fluid through the first subset of nozzles to the first flow rate of the fluid through the first subset of nozzles when the first subset of nozzles is cleaned.

11 Claims, 3 Drawing Sheets

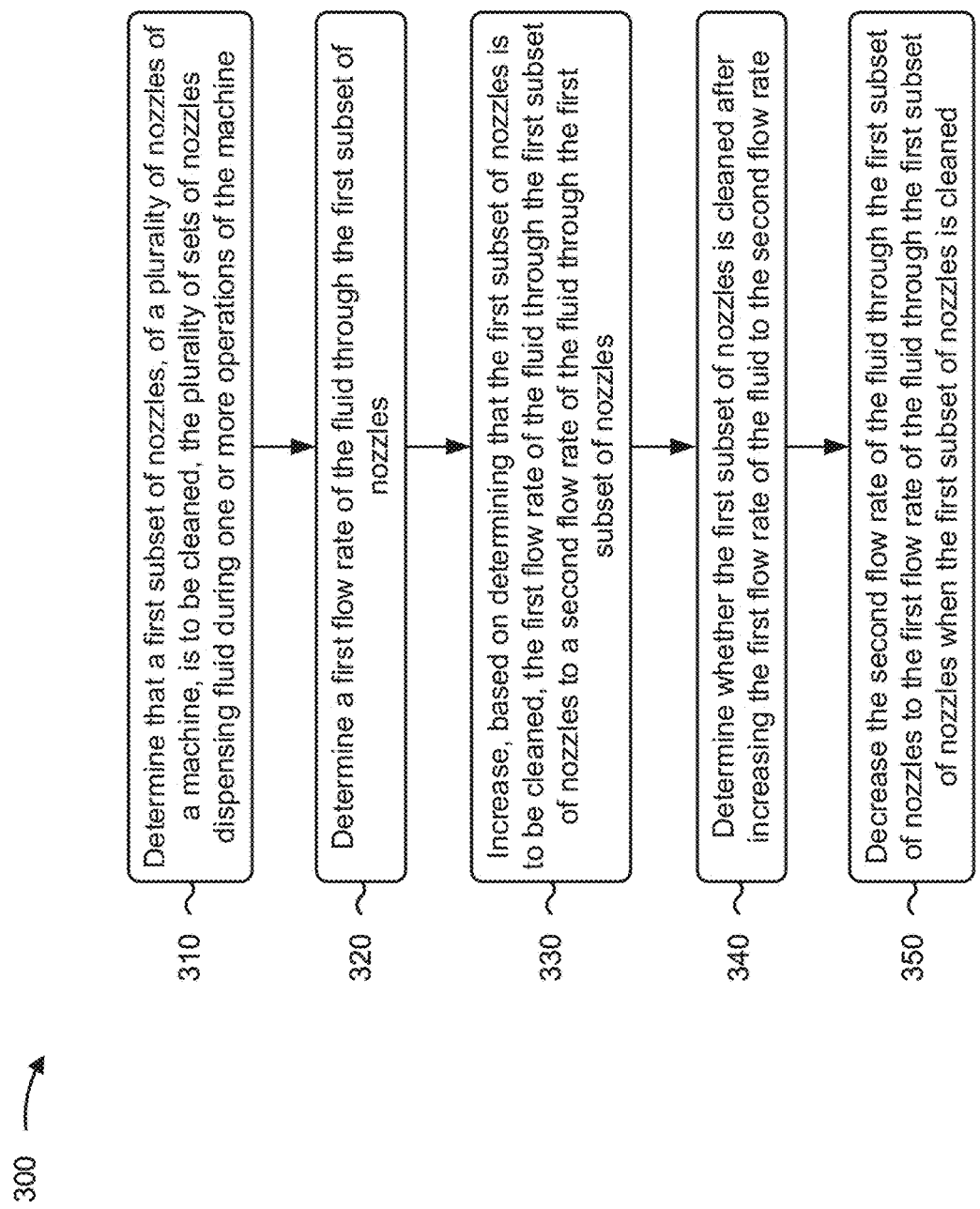

CLEANING NOZZLES OF A MACHINE

TECHNICAL FIELD

The present disclosure relates generally to cleaning nozzles of a machine.

BACKGROUND

A rotary mixer is used to perform operations related to roadway construction and roadway maintenance. During performance of such operations, the spray nozzles of a spray system of the rotary mixer dispense liquid (e.g., water, emulsion, and/or the like) into a mixing chamber of a milling drum of the rotary mixer. Over a period of time, material (e.g., cement dust, roadway particles, and/or the like) are introduced in the mixing chamber. Such material accumulates in the spray nozzles, thereby causing the spray nozzles to become clogged. As a result, an operator of the rotary mixer needs to manually cycle through each nozzle and manually cause water to be dispensed (using the spray system) through each nozzle to remove the accumulated material. Alternatively, each nozzle is physically unclogged. Such manual and physical unclogging methods can be tedious and time consuming.

A self-cleaning mixer for cement slurry is disclosed in U.S. Pat. No. 5,718,508 issued to Haltec Corp. ("the '508 patent"). The '508 patent discloses a self-cleaning mixer that includes a cylindrical housing and a feedscrew extending longitudinally through the housing for mixing water and cement and conveying the slurry through the housing. The '508 patent further discloses that the housing includes a plurality of inwardly directed nozzles fed from a pair of manifolds. The '508 patent additionally discloses that, during a cleaning cycle, one of the manifolds is shut off, thereby increasing the water pressure in the other manifold and increasing the force of the spray to enhance cleaning.

While the '508 patent may disclose a cleaning cycle with respect to the pair of manifolds, the '508 patent does not disclose cleaning the plurality of inwardly directed nozzles.

The process of cleaning nozzles of the present disclosure solves one or more of the problems set forth above and/or other problems in the art.

SUMMARY

According to some implementations, a method may include determining that a first subset of nozzles, of a plurality of nozzles of the machine, is to be cleaned, the plurality of nozzles dispensing fluid during one or more operations of the machine; determining a first flow rate of the fluid through the first subset of nozzles; increasing, based on determining that the first subset of nozzles is to be cleaned, the first flow rate of the fluid through the first subset of nozzles to a second flow rate of the fluid through the first subset of nozzles; determining whether the first subset of nozzles is cleaned after increasing the first flow rate of the fluid to the second flow rate of the fluid; and decreasing the second flow rate of the fluid through the first subset of nozzles to the first flow rate of the fluid through the first subset of nozzles when the first subset of nozzles is cleaned.

According to some implementations, a machine may include a plurality of nozzles to dispense fluid during one or more operations of the machine; and one or more processors configured to determine that a nozzle, of the plurality of nozzles, is to be cleaned; determine a first flow rate of the fluid through the nozzle; increase, based on determining that the nozzle is to be cleaned, the first flow rate of the fluid through the nozzle to a second flow rate of the fluid through the nozzle; and decrease the second flow rate of the fluid through the nozzle to the first flow rate of the fluid through the nozzle when the nozzle is cleaned.

According to some implementations, a system may include a plurality of nozzles to dispense fluid; and one or more processors configured to a plurality of nozzles to dispense fluid; and determine that one or more nozzles, of the plurality of nozzles, are to be cleaned; determine a first flow rate of the fluid through the one or more nozzles; increase, based on determining that the one or more nozzles are to be cleaned, the first flow rate of the fluid through the one or more nozzles to a second flow rate of the fluid through the one or more nozzles, the first flow rate being increased over a period of time; and decrease, after the period of time, the second flow rate of the fluid through the one or more first nozzles to the first flow rate of the fluid through the one or more nozzles when the one or more nozzles are cleaned.

BRIEF DESCRIPTION OF THE DRAWINGS

FIG. 3 is a flow chart of an example process for cleaning nozzles of the machine of FIG. 1.

DETAILED DESCRIPTION

This disclosure relates to a process for cleaning nozzles. The process for cleaning nozzles has universal applicability to any machine utilizing nozzles. The term "machine" may refer to any machine that performs an operation associated with an industry such as, for example, mining, construction, farming, transportation, or any other industry. Although some implementations described herein relate to a rotary mixer, the implementations apply equally to other types of machines, such as a cold planer, a road reclaimer, a vehicle with nozzles, or another above ground equipment, underground equipment, or marine equipment. Moreover, one or more implements may be connected to the machine.

Figure 1:
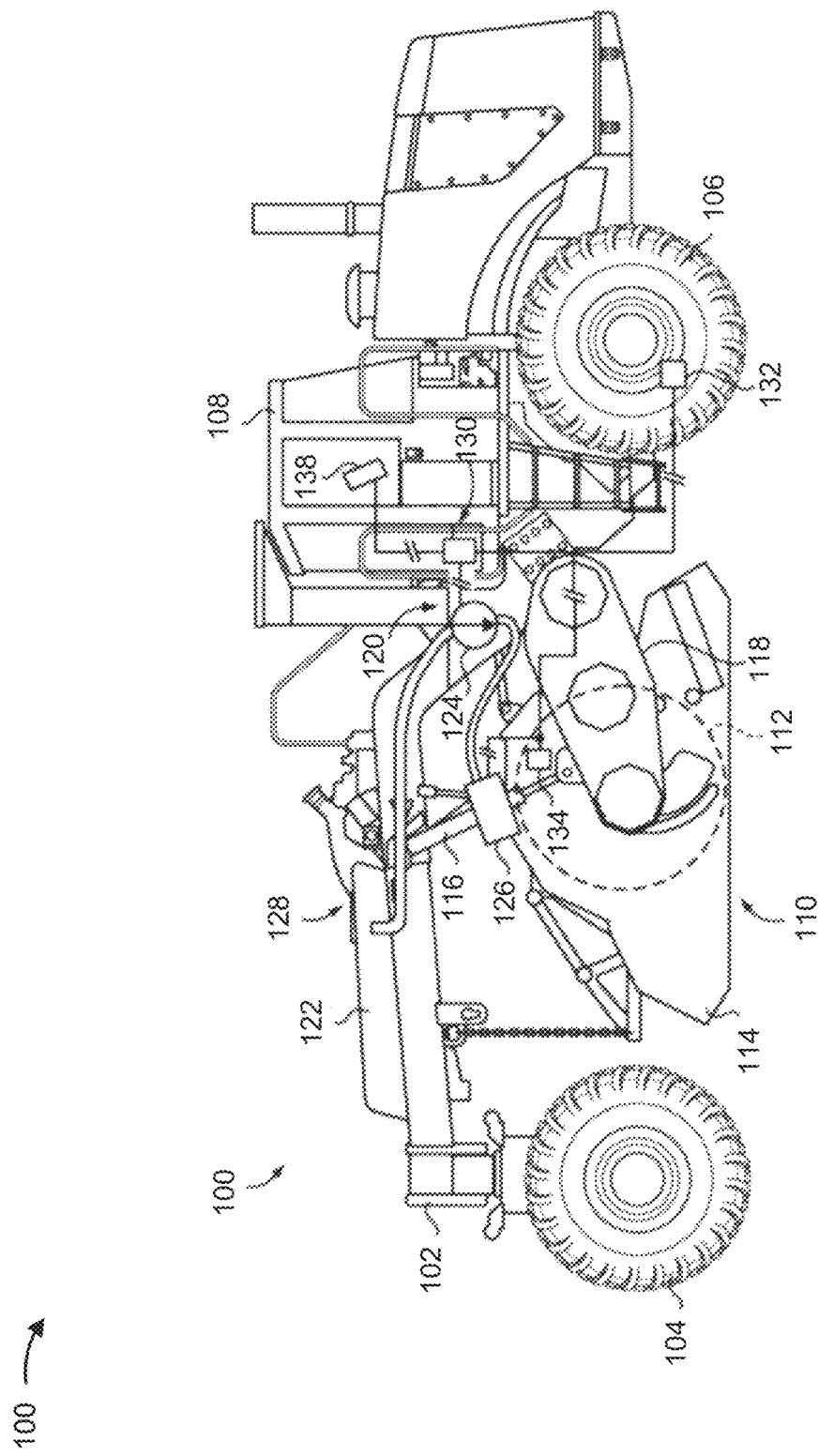
FIG. 1 is diagram of an example machine described herein.

FIG. 1 is a diagram of an example machine described herein. Machine 100 is shown in FIG. 1 as a rotary mixer but may be any other type of machine, as explained above. As shown in FIG. 1, machine 100 includes a frame 102, ground-engaging elements 104 and 106 that are coupled to frame 102, and a cab 108 supported by frame 102. Ground-engaging elements 104 and 106 may include ground-engaging wheels. In some examples, ground-engaging elements 104 and 106 may be implemented as ground engaging traction elements, such as tracks.

As shown in FIG. 1, machine 100 further includes a material working system 110 that is movable relative to frame 102 to work material of a substrate at different working depths. Material working system 110 includes a rotor 112 positioned within a housing 114 that is supported vertically below frame 102 between ground-engaging elements 104 and 106. Rotor 112 is positioned to work material of the substrate at a particular working depth. Rotor 112 may be at different positions to work material of the substrate at different working depths. As shown in FIG. 1, machine 100 further includes one or more actuators 116, a support bar 118, and a tank 122 (e.g., fuel tank). Actuator 116 may vertically adjust rotor 112 and/or other components of material working system 110. Support bar 118 may support material working system 110 at any various vertical positions.

As shown in FIG. 1, machine 100 further includes a liquid application system 120 that includes liquid dispensing system 128. Liquid dispensing system 128 dispenses a liquid to material being worked by material working system 110. Liquid dispensing system 128 may include a pump 124 and a sprayer 126 positioned to spray fluid (e.g., from a water tank (not shown)) on material being worked by material working system 110. Sprayer 126 may include a spray bar (not shown) having nozzles (not shown but discussed below with respect to FIG. 2).

As shown in FIG. 1, machine 100 further includes an electronic control module (ECM) 130 configured to control various operations of machine 100. ECM 130 may control the operations of machine 100 according to input from operator interface 138 in cab 108. For example, ECM 130 may receive machine operation information from an operator interface 138 (described below) and control liquid dispensing system 128 based on the machine operation information. For instance, machine operation information may include information identifying a particular soil moisture density (e.g., associated with material worked by machine 100), information identifying a particular working depth for working the material, information identifying a particular amount of liquid dispensed, information indicating whether machine 100 is to perform an emulsion operation (e.g., whether to dispense emulsion or dispense only water), and/or the like. ECM 130 may be configured to autonomously control (e.g., without input from operator interface 138) a portion of or all of the operations of machine 100.

As shown in FIG. 1, machine 100 further includes a first monitoring device 132. First monitoring device 132 may be configured to monitor operations of ground-engaging elements 104 and 106, generate ground speed information indicative of a ground speed of machine 100, and transmit ground speed information to ECM 130. In some implementations, first monitoring device 132 may include a wheel speed sensor, a global positioning system (GPS) receiver, ground radar, and/or any device that may be used to directly or indirectly determine or estimate a ground speed of machine 100.

As shown in FIG. 1, machine 100 further includes a second monitoring device 134. Second monitoring device 134 may be configured to monitor operations and/or performance of liquid dispensing system 128, generate liquid dispensing information associated with liquid dispensing system 128, and transmit such liquid dispensing information to ECM 130. For example, liquid dispensing information may include any information associated with operations and/or performance of liquid dispensing system 128. For instance, liquid dispensing information may include information that may be used to determine whether one or more nozzles are to be cleaned. Second monitoring device 134 may include a sensor (e.g., fluid pressure sensor, fluid flow rate sensor, and/or the like), a camera, and/or any device that may be used to monitor operations and/or performance of liquid dispensing system 128.

In some implementations, first monitoring device 132 and second monitoring device 134 may be configured to coincide with ECM 130, may be configured as a separate control system, and/or may be configured as a part of other control systems. Further, the ECM 130 may control first monitoring device 132 and second monitoring device 134 by using computer software, hardware, or a combination of software and hardware. For example, ECM 130 may execute instructions to cause first monitoring device 132 to report ground speed information and cause second monitoring device 134 to report liquid dispensing information. ECM 130 may obtain information (e.g., ground speed information and/or liquid dispensing information) from first monitoring device 132 and/or second monitoring device 134 and may provide information (e.g., ground speed information and/or liquid dispensing information) to operator interface 138 and/or to a remotely located device (e.g., a backend monitoring system communicatively coupled with machine 100 and/or ECM 130).

Operator interface 138 is included in cab 108 and can be used to operate machine 100. For example, operator interface 138 may include one or more input devices (e.g., buttons, keypads, touchscreens, trackballs, joy sticks, levers, pedals, steering mechanisms, and/or the like) and/or output devices (e.g., displays, illumination indicators, speakers, and/or the like) to control, monitor, and/or interact with machine 100.

As indicated above, FIG. 1 is provided as an example. Other examples may differ from what was described in connection with FIG. 1.

Figure 2:
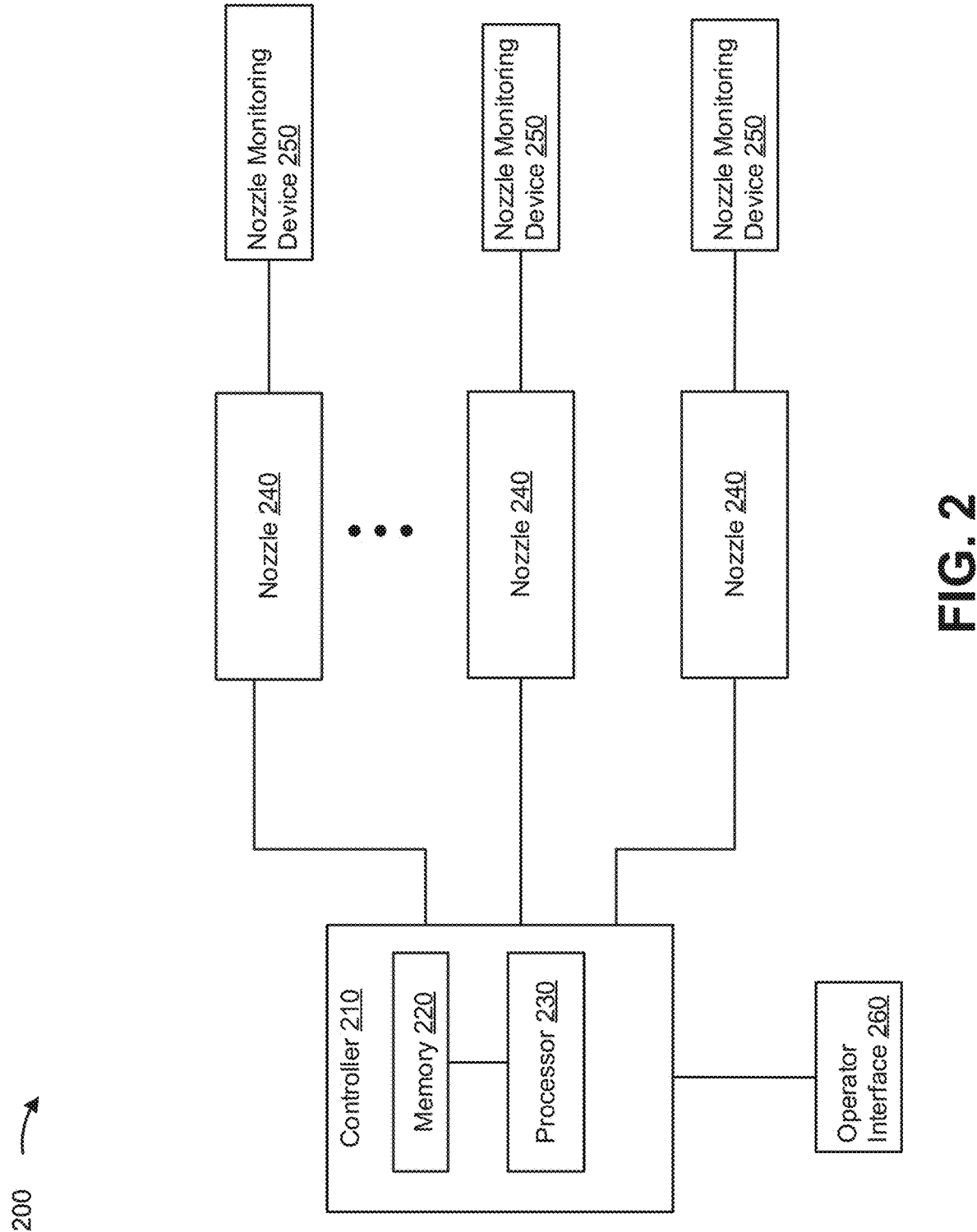
FIG. 2 is a diagram of an example system, described herein, that may be implemented in association with the machine of FIG. 1.

FIG. 2 is a diagram of an example system, described herein, that may be implemented in association with the machine of FIG. 1. As shown in FIG. 2, system 200 of FIG. 2 includes a controller 210 that includes one or more memories 220 (referred to herein individually as "memory 220," and collectively as "memories 220") and one or more processors 230 (referred to herein individually as "processor 230," and collectively as "processors 230"). System 200 further includes one or more nozzles 240 (referred to herein individually as "nozzle 240," and collectively as "nozzles 240"), one or more nozzle monitoring devices 250 (referred to herein individually as "nozzle monitoring device 250," and collectively as "nozzle monitoring devices 250"), and an operator interface 260.

Controller 210 may be associated with, included within, and/or correspond to ECM 130 of FIG. 1. Memory 220 may include a random-access memory (RAM), a read only memory (ROM), and/or another type of dynamic or static storage device (e.g., a flash memory, a magnetic memory, and/or an optical memory) that stores information and/or instructions for use by processor 230 (e.g., information and/or instructions associated with nozzles 240). Processor 230 may be implemented in hardware, firmware, and/or a combination of hardware and software. Processor 230 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 230 may include one or more processors capable of being programmed to perform a function.

Nozzle 240 may dispense fluid (e.g., a single type of fluid and/or a mixture of different types of fluid) at different flow rates based on an operation of machine 100. For example, nozzle 240 may dispense fluid at different flow rates based on material being worked on by machine 100, whether machine 100 is performing an emulsion operation, a particular soil moisture density of material worked by machine 100 (e.g., identified by user input submitted using operator interface 260), and/or the like. The single type of fluid includes water. The mixture of different types of fluid includes emulsion (e.g., bitumen emulsion, asphalt emulsion, and/or the like).

Nozzle monitoring device 250 may be associated with, included within, and/or correspond to second monitoring device 134 of FIG. 1. Nozzle monitoring device 250 may include one or more devices, components, and/or elements that are capable of receiving, generating, storing, processing, and/or providing nozzle information associated with one or more nozzles 240. As shown in FIG. 2, nozzle monitoring device 250 is communicatively coupled to a single nozzle 240. Alternatively, nozzle monitoring device 250 may be communicatively coupled to multiple nozzles 240. In some implementations, nozzle information may include information identifying a flow rate of fluid dispensed through nozzle 240, information identifying a period of time since a last cleaning of nozzle 240, information identifying a type of usage of nozzle 240 (e.g., in light of an operation of machine 100), information identifying an amount of usage of nozzle 240, information indicating whether nozzle 240 is being used in an operation of machine 100, information indicating whether nozzle 240 is cleaned, and/or any information regarding an operation of and/or performance of nozzle 240. Nozzle monitoring device 250 may transmit nozzle information to controller 210 for storage (e.g., in memory 220) and/or use (e.g., by processor 230).

Nozzle monitoring device 250 may generate information identifying the flow rate by measuring the flow rate of the fluid dispensed through nozzle 240 and generating sensor data indicating the flow rate of the fluid dispensed through nozzle 240. Additionally, or alternatively, nozzle monitoring device 250 may generate information identifying the flow rate by capturing an image of the flow rate of the fluid dispensed through nozzle 240 and generating sensor data indicating the flow rate of the fluid dispense through nozzle 240. Nozzle monitoring device 250 may generate information indicating whether nozzle 240 is cleaned by capturing an image of nozzle 240 and generating image data identify any obstruction (e.g., any material) within nozzle 240.

Operator interface 260 may be associated with, included within, and/or correspond to operator interface 138 of FIG. 1. Operator interface 260 may control, monitor, and/or interact with one or more nozzles via controller 210. For example, operator interface 260 may receive information (e.g., machine operation information discussed above with respect to FIG. 1) and control, monitor, and/or interact with one or more nozzles via controller 210 based on the information.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of environment system 200.

FIG. 3 is example process for cleaning nozzles of the machine of FIG. 1. One or more process blocks of FIG. 3 may be performed by controller 210. Additionally, or alternatively, one or more process blocks of FIG. 3 may be performed by another device or a group of devices separate from or including controller 210, such as one or more nozzles 240, one or more nozzle monitoring devices 250, and/or operator interface 260.

As shown in FIG. 3, process 300 may include determining that a first subset of nozzles, of a plurality of nozzles of the machine, is to be cleaned (block 310). For example, controller 210 associated with machine 100 (e.g., using memory 220, processor 230, and/or the like) may determine that a first subset of nozzles 240, of a plurality of nozzles 240, is to be cleaned, as described above. As used herein, a subset of nozzles 240 may include a single nozzle 240 of machine 100, multiple nozzles 240 of machine 100, or all nozzles 240 of machine 100. Nozzles 240 may dispense fluid during one or more operations of the machine, as described above. The fluid may include water.

As further shown in FIG. 3, process 300 may include determining a first flow rate of the fluid through the first subset of nozzles (block 320). For example, controller 210 (e.g., using memory 220, processor 230, and/or the like) may determine a first flow rate of the fluid (e.g., a current flow of the fluid) through the first subset of nozzles 240, as described above. For instance, controller 210 may determine the first flow rate of the fluid through the first subset of nozzles 240 based on nozzle information received from one or more nozzle monitoring devices 250 associated with the first subset of nozzles 240.

As further shown in FIG. 3, process 300 may include increasing, based on determining that the first subset of nozzles is to be cleaned, the first flow rate of the fluid through the first subset of nozzles to a second flow rate of the fluid through the first subset of nozzles (block 330). For example, controller 210 (e.g., using memory 220, processor 230, and/or the like) may increase, based on determining that the first subset of nozzles 240 is to be cleaned, the first flow rate of the fluid through the first subset of nozzles 240 to a second flow rate of the fluid through the first subset of nozzles 240, as described above. For instance, controller 210 may increase a pressure of the fluid through a nozzle 240 in order to increase a flow rate of the fluid through nozzle 240. Controller 210 may increase the pressure by terminating the flow of the fluid through one or more other nozzles 240, as will be described in more detail below. In some implementations, the first flow rate may be increased over a period of time. As an example, the period of time may be identified based on user input received via operator interface 260. Additionally, or alternative, the period of time may be automatically determined by controller 210 (e.g., without user input). For example, controller 210 and/or nozzle monitoring device 250 may monitor an amount of time for cleaning each of multiple nozzles 240 and store, in memory 220 as cleaning time information, an average of the amount of time for cleaning the multiple nozzles 240. The period of time may correspond to or may be based on cleaning time information.

As further shown in FIG. 3, process 300 may include determining whether the first subset of nozzles is cleaned after increasing the first flow rate of the fluid to the second flow rate of the fluid (block 340). For example, controller 210 (e.g., using memory 220, processor 230, and/or the like) may determine whether the first subset of nozzles 240 is cleaned after increasing the first flow rate of the fluid to the second flow rate of the fluid, as described above. In some implementations, controller 210 may determine whether the first subset of nozzles 240 is cleaned based on the period of time. For example, controller 210 may determine that the first subset of nozzles is cleaned after the period of time has elapsed. Additionally, or alternatively, controller 210 may determine whether the first subset of nozzles is cleaned based on comparing a requested flow rate of the fluid through the first subset of nozzles and an actual flow rate of the fluid through the first subset of nozzles 240. The requested flow rate may be a flow rate request based on user input received via operator interface 260 or a flow rate request determined by controller 210. The actual flow rate may be a flow rate measured by one or more nozzle monitoring devices 250 associated with the first subset of nozzles.

As further shown in FIG. 3, process 300 may include decreasing the second flow rate of the fluid through the first subset of nozzles to the first flow rate of the fluid through the first subset of nozzles when the first subset of nozzles is cleaned (block 350). For example, controller 210 (e.g., using memory 220, processor 230, and/or the like) may decrease the second flow rate of the fluid through the first subset of nozzles 240 to the first flow rate of the fluid through the first subset of nozzles when the first subset of nozzles 240 is cleaned, as described above. For instance, controller 210 may decrease the second flow rate after the period of time (discussed above with respect to block 330). Additionally, or alternatively, controller 210 may decrease the second flow rate based on nozzle information associated with the first subset of nozzles 240. For example, the nozzle information may indicate that the first subset of nozzles 240 is no longer clogged.

Process 300 may include additional implementations, such as any single implementation or any combination of implementations described above, below, and/or in connection with one or more other processes described elsewhere herein.

Controller 210 may determine that the first subset of nozzles 240 has been selected for a first operation of the one or more operations; select the first subset of nozzles 240 for a second operation of the one or more operations based on determining that the first subset of nozzles 240 is to be cleaned; determine that the first subset of nozzles 240 is cleaned; and select the first subset of nozzles 240 for the first operation based on determining that the first subset of nozzles 240 is cleaned. During the first operation, the first subset of nozzles 240 may dispense a mixture of the fluid with another fluid. For example, during the first operation, the first subset of nozzles 240 may dispense emulsion (e.g., a mixture of water and another fluid). During the second operation, the first subset of nozzles 240 may dispense the fluid without the other fluid. For example, the first subset of nozzles 240 may dispense water without any other fluid.

Controller 210 may determine that a second subset of nozzles 240, of the plurality of nozzles 240, is to be cleaned after decreasing the second flow rate of the fluid through the first subset of nozzles 240; increase, based on determining that the second subset of nozzles 240 is to be cleaned, a flow rate of the fluid through the second subset of nozzles 240 to clean the second subset of nozzles 240; determine whether the second subset of nozzles 240 is cleaned after increasing the flow rate of the fluid through the second subset of nozzles 240; and decrease the flow rate of the fluid through the second subset of nozzles 240 when the second subset of nozzles 240 is cleaned, in a manner similar to that described above with respect to blocks 310-350. The second subset of nozzles 240 is different than the first subset of nozzles 240.

Controller 210 may determine that the second subset of nozzles 240 is to be cleaned based on information identifying a sequence of cleaning nozzles 240. The information identifying the sequence of cleaning nozzles 240 may be based on user input received via operator interface 260. Additionally, or alternatively, controller 210 may determine the information identifying the sequence of cleaning nozzles 240 based on controller 210 monitoring a prior sequence of cleaning nozzles 240 (e.g., prior to determining that the second set of nozzles is to be cleaned). Controller 210 may determine the information identifying the sequence of cleaning nozzles 240 based on nozzle information, as described above with respect to FIG. 2. The information identifying the sequence of cleaning nozzles 240 may be stored in memory 220.

In some examples, the first subset of nozzles 240 includes a single nozzle 240 of the plurality of nozzles 240. In some other examples, the plurality of nozzles 240 includes a plurality of groups of nozzles 240.

Controller 210 may determine that the first subset of nozzles 240 is to be cleaned by receiving user input indicating that the first subset of nozzles 240 is to be cleaned, and determining that the first subset of nozzles 240 is to be cleaned based on the user input. The user input may be received via operator interface 260, as described above.

Controller 210 may determine that the first subset of nozzles 240 is to be cleaned by obtaining information indicating that the first subset of nozzles 240 is to be cleaned; and determines, without user input, that the first subset of nozzles 240 is to be cleaned based on the information indicating that the first subset of nozzles 240 is to be cleaned. The information indicating that the first subset of nozzles 240 is to be cleaned may be obtained from one or more nozzle monitoring devices 250 associated with the first subset of nozzles 240. In some implementations, controller 210 may receive user input (e.g., via operator interface 260) identifying another nozzle 240 to be cleaned. Controller 210 may, therefore, cause the other nozzle 240 to be cleaned instead of, in parallel with, or prior to the first subset of nozzles 240 being cleaned.

Controller 210 may obtain, from nozzle monitoring device 250, sensor data indicating that one or more nozzles 240, of the first subset of nozzles 240, are obstructed. For instance, the sensor data may indicate that the flow rate of the first subset of nozzles 240 is a below a threshold flow rate corresponding a nozzle 240 that is cleaned.

In some implementations, controller 210 may obtain the information indicating that the first subset of nozzles 240 is to be cleaned by obtaining, from a camera, image data indicating that one or more nozzles 240, of the first subset of nozzles 240, are obstructed are obstructed. For example, controller 210 may obtain, from nozzle monitoring device 250, image data indicating that one or more nozzles 240, of the first subset of nozzles 240, are obstructed.

Controller 210 may determine that the first subset of nozzles 240 is to be cleaned by determining whether an amount of time since a last cleaning of the first subset of nozzles 240 satisfies a threshold amount of time, and determining that the first subset of nozzles 240 is to be cleaned when the amount of time satisfies the threshold amount of time. For instance, controller 210 and/or one or more nozzle monitoring devices 250 may track an amount of time since a last cleaning of the first subset of nozzles 240. The threshold amount of time may be determined in a manner similar to that described above with respect to the sequence of cleaning nozzles 240 (e.g., determined based on user input or determined by controller 210 without user input). Information identifying the threshold amount of time may be stored in memory 220.

Controller 210 may determine whether an amount of usage of the first subset of nozzles 240 since a last cleaning of the first subset of nozzles 240 satisfies a threshold amount of usage, and determine that the first subset of nozzles 240 is to be cleaned when the amount of usage satisfies the threshold amount of usage. The threshold amount of usage may be determined in a manner similar to that described above with respect to the sequence of cleaning nozzles 240 (e.g., determined based on user input or determined by controller 210 without user input). The threshold amount of usage may be based on an amount of usage from a time when a nozzle 240 is cleaned until a time when the nozzle 240 is anticipated to require cleaning. Information identifying the threshold amount of usage may be stored in memory 220.

Controller 210 may decrease a flow rate of the fluid (e.g., a current flow rate of the fluid) through a second subset of nozzles 240, of the plurality of nozzles 240, in order to increase the flow rate of the fluid through the first subset of nozzles 240. Controller 210 may subsequently decrease the flow rate of the fluid through the second subset of nozzles 240 after the first subset of nozzles 240 is cleaned.

Controller 210 may determine whether a second nozzle 240 (e.g., of the second subset of nozzles 240) is being used in the one or more operations of the machine; and decrease the current flow rate of the fluid through the second nozzle 240 when the second nozzle 240 is not being used in the one or more operations of the machine 100. For example, controller 210 and/or nozzle monitoring device 250 may determine whether the second nozzle 240 is being used in the one or more operations based on nozzle information associated with the second nozzle 240 (described above with respect to FIG. 2).

Controller 210 may determine whether the second nozzle 240 is being used in the one or more operations of the machine 100 by determining whether the second nozzle 240 is being used to achieve a particular soil moisture density (e.g., of material worked on by machine 100). For example, controller 210 and/or nozzle monitoring device 250 may determine whether the second nozzle 240 is being used to achieve the particular soil moisture density based on nozzle information associated with the second nozzle 240.

Controller 210 and/or nozzle monitoring device 250 may decrease a flow rate of the fluid by determining whether a period of time since a last cleaning of the second nozzle 240 satisfies a threshold period of time; and decrease the increased flow rate of the fluid through the second nozzle 240 when the period of time satisfies the threshold period of time, as described above.

Controller 210 may increase the first flow rate of the fluid through the nozzle 240 by initiating a flow of the fluid through a nozzle 240 (e.g., of the first subset of nozzles 240). For instance, prior to increasing the first flow rate of the fluid, no fluid will be dispensed through the nozzle 240. Controller 210 may subsequently terminate the flow of the fluid through the nozzle 240 (e.g., after a threshold period of time and/or after the nozzle 240 is cleaned).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed process for cleaning nozzles has universal applicability to any machine utilizing nozzles that can become obstructed over a period of time. The disclosed process for cleaning nozzles includes cleaning selected nozzle(s) of a machine by adjusting a flow rate of fluid (e.g., water) through the selected nozzle(s) and/or other nozzle(s).

Several advantages may be associated with the disclosed process for cleaning nozzles. For example, the use of the disclosed process of cleaning nozzles may decrease or eliminate the need to manually and/or physically clean the nozzles of a machine. Additionally, the use of the disclosed process of cleaning nozzles improves the efficiency of fluid usage when cleaning the nozzles. For example, the increase in the flow rate of the fluid is limited to a period of time. Therefore, the use of unnecessary or excess amount fluid is reduced. For instance, the amount of dispensed fluid on the ground may be reduced. Further, the disclosed process of cleaning nozzles identifies nozzle(s) that is(are) not being used during an operation of the machine. Therefore, any disruption during an operation of the machine (that uses nozzle(s)) is reduced. Furthermore, the disclosed process of cleaning nozzles maintains a desired soil moisture density. Moreover, the disclosed process of cleaning nozzles improves accuracy in cleaning nozzles of a machine by ensuring that a nozzle, actually requiring cleaning, is cleaned.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

What is claimed is:

1. A method performed by a controller associated with a construction machine, the method comprising:
   determining that a first subset of nozzles, of a plurality of nozzles of the construction machine, is to be cleaned, the plurality of nozzles dispensing working liquid during one or more operations of the construction machine;
   determining a first flow rate of the working liquid through the first subset of nozzles;
   increasing, based on determining that the first subset of nozzles is to be cleaned, the first flow rate of the working liquid through the first subset of nozzles to a second flow rate of the working liquid through the first subset of nozzles;
   determining, based on an actual flow rate of the working liquid through the first subset of nozzles, that the first subset of nozzles is cleaned after increasing the first flow rate of the working liquid to the second flow rate of the working liquid; and
   decreasing the second flow rate of the working liquid through the first subset of nozzles to the first flow rate of the working liquid through the first subset of nozzles based on determining that the first subset of nozzles is cleaned.

2. The method of claim 1, further comprising:
   determining, before determining that the first subset of nozzles is to be cleaned, that the first subset of nozzles has been selected for a first operation of the one or more operations,
      wherein, during the first operation, the first subset of nozzles dispenses a mixture of the working liquid with another fluid; and
   selecting the first subset of nozzles for a second operation of the one or more operations based on determining that the first subset of nozzles is to be cleaned,
      wherein, during the second operation, the first subset of nozzles dispenses the working liquid without the other fluid.

3. The method of claim 1, further comprising:
   determining that a second subset of nozzles, of the plurality of nozzles, is to be cleaned after decreasing the second flow rate of the working liquid through the first subset of nozzles,
      wherein the second subset of nozzles is different than the first subset of nozzles;

increasing, based on determining that the second subset of nozzles is to be cleaned, a flow rate of the working liquid through the second subset of nozzles to clean the second subset of nozzles;

determining whether the second subset of nozzles is cleaned after increasing the flow rate of the working liquid through the second subset of nozzles; and decreasing the flow rate of the working liquid through the second subset of nozzles when the second subset of nozzles is cleaned.

4. The method of claim 1, wherein the first subset of nozzles includes a single nozzle of the plurality of nozzles.

5. The method of claim 1, wherein the plurality of nozzles includes a plurality of groups of nozzles, and wherein a group of nozzles, of the plurality of groups of nozzles, includes multiple nozzles, and wherein the first subset of nozzles includes the group of nozzles.

6. The method of claim 1, wherein determining that the first subset of nozzles is to be cleaned comprises:

receiving user input indicating that the first subset of nozzles is to be cleaned, and determining that the first subset of nozzles is to be cleaned based on the user input.

7. The method of claim 1, wherein determining that the first subset of nozzles is to be cleaned comprises:

obtaining information indicating that the first subset of nozzles is to be cleaned; and determining, without user input, that the first subset of nozzles is to be cleaned based on the information indicating that the first subset of nozzles is to be cleaned.

8. The method of claim 7, wherein obtaining the information indicating that the first subset of nozzles is to be cleaned comprises:

obtaining, from a sensor, sensor data indicating that one or more nozzles, of the first subset of nozzles, are obstructed.

9. The method of claim 7, wherein obtaining the information indicating that the first subset of nozzles is to be cleaned comprises:

obtaining, from a camera, image data indicating that one or more nozzles, of the first subset of nozzles, are obstructed.

10. The method of claim 1, wherein determining that the first subset of nozzles is to be cleaned comprises:

determining whether an amount of time since a last cleaning of the first subset of nozzles satisfies a threshold amount of time; and determining that the first subset of nozzles is to be cleaned when the amount of time satisfies the threshold amount of time.

11. The method of claim 1, wherein determining that the first subset of nozzles is to be cleaned comprises:

determining whether an amount of usage of the first subset of nozzles since a last cleaning of the first subset of nozzles satisfies a threshold amount of usage; and determining that the first subset of nozzles is to be cleaned when the amount of usage satisfies the threshold amount of usage.

* * * * *